(12) United States Patent
Ling

(10) Patent No.: US 10,705,209 B2
(45) Date of Patent: *Jul. 7, 2020

(54) DYNAMIC OFDM SYMBOL SHAPING FOR RADAR APPLICATIONS

(71) Applicant: Maxlinear, Inc., Carlsbad, CA (US)

(72) Inventor: Curtis Ling, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,705

(22) Filed: Nov. 13, 2018

(65) Prior Publication Data

US 2019/0079182 A1 Mar. 14, 2019

Related U.S. Application Data

(63) Continuation of application No. 15/150,821, filed on May 10, 2016, now Pat. No. 10,126,421.
(Continued)

(51) Int. Cl.
*G01S 13/931* (2020.01)
*G01S 7/28* (2006.01)
(Continued)

(52) U.S. Cl.
CPC .......... *G01S 13/931* (2013.01); *G01S 7/2813* (2013.01); *G01S 13/0209* (2013.01); *G01S 13/42* (2013.01);
(Continued)

(58) Field of Classification Search
CPC .. G01S 13/931; G01S 7/2813; G01S 13/0209; G01S 13/42; G01S 13/87;
(Continued)

(56) References Cited

U.S. PATENT DOCUMENTS 6,563,786 B1 * 5/2003 Nee ........................ H04L 1/0002
370/208
6,687,315 B2 * 2/2004 Keevill ................. H04L 27/265
375/326
(Continued)

FOREIGN PATENT DOCUMENTS

FR 2834072 A1 6/2003

*Primary Examiner* — Bernarr E Gregory
*Assistant Examiner* — Nuzhat Pervin
(74) *Attorney, Agent, or Firm* — McAndrews, Held & Malloy, Ltd.

(57) ABSTRACT

A radar transmitter comprises orthogonal frequency division multiplexing (OFDM) symbol generation circuitry, windowing circuitry, and control circuitry. The OFDM symbol generation circuitry is operable to modulate data onto a plurality of subcarriers to generate a plurality of OFDM symbols. The windowing circuitry is configurable to support a plurality of windowing functions. The control circuitry is operable to analyze returns from a previous transmission of the radar transmitter to determine characteristics of the environment into which the previous transmission was transmitted. The control circuitry is operable to select which one of the plurality of windowing functions the windowing circuitry is to apply to each of the plurality of OFDM symbols based on the characteristics of the environment. A first one of the windowing functions may correspond to a first radiation pattern and the second one of the windowing functions may correspond to a second radiation pattern.

20 Claims, 8 Drawing Sheets

Related U.S. Application Data

(60) Provisional application No. 62/162,206, filed on May 15, 2015.

(51) Int. Cl.

| | |
|---|---|
| *G01S 13/02* | (2006.01) |
| *G01S 13/42* | (2006.01) |
| *G01S 13/87* | (2006.01) |
| *G01S 13/89* | (2006.01) |
| *G01S 13/60* | (2006.01) |
| *G01S 13/86* | (2006.01) |
| G01S 7/00 | (2006.01) |
| G01S 7/40 | (2006.01) |
| *H01Q 1/32* | (2006.01) |
| *H01Q 3/24* | (2006.01) |

(52) U.S. Cl.
CPC ............ *G01S 13/87* (2013.01); *G01S 13/874* (2013.01); *G01S 13/89* (2013.01); *G01S 7/006* (2013.01); *G01S 7/4004* (2013.01); *G01S 13/60* (2013.01); *G01S 13/86* (2013.01); *G01S 2013/93271* (2020.01); *G01S 2013/93272* (2020.01); *G01S 2013/93273* (2020.01); *G01S 2013/93274* (2020.01); *G01S 2013/93275* (2020.01); *G01S 2013/93276* (2020.01); *H01Q 1/3233* (2013.01); *H01Q 3/24* (2013.01)

(58) Field of Classification Search
CPC ........ G01S 13/874; G01S 13/89; G01S 7/006; G01S 7/4004; G01S 13/60; G01S 13/86; G01S 2013/9375; G01S 2013/9378; G01S 2013/9382; G01S 2013/9385; G01S 2013/9389; G01S 2013/9392; H01Q 1/3233; H01Q 3/24
USPC .......................................................... 342/27
See application file for complete search history.

(56) References Cited

U.S. PATENT DOCUMENTS

| | | | |
|---|---|---|---|
| 6,999,025 B2 | 2/2006 | Poullin | |
| 7,994,969 B2 | 8/2011 | Van Caekenberghe | |
| 8,165,232 B2* | 4/2012 | Moffatt | H04L 27/262 375/259 |
| 8,441,393 B2 | 5/2013 | Strauch et al. | |
| 8,860,605 B2 | 10/2014 | Lellouch | |
| 8,891,430 B1* | 11/2014 | Sahin | H04L 27/00 370/312 |
| 9,407,487 B2* | 8/2016 | Ma | H04L 1/0003 |
| 10,126,421 B2* | 11/2018 | Ling | G01S 13/42 |
| 2002/0003488 A1 | 1/2002 | Levin | |
| 2003/0142764 A1* | 7/2003 | Keevill | H04L 27/265 375/341 |
| 2003/0152023 A1* | 8/2003 | Hosur | H04L 27/2602 370/208 |
| 2005/0232134 A1* | 10/2005 | van Nee | H04L 1/0002 370/206 |
| 2010/0080265 A1* | 4/2010 | Moffatt | H04L 5/0007 375/135 |
| 2010/0080310 A1* | 4/2010 | Moffatt | H04L 27/2613 375/260 |
| 2010/0080311 A1* | 4/2010 | Moffatt | H04L 25/022 375/260 |
| 2010/0080312 A1* | 4/2010 | Moffatt | H04B 1/713 375/260 |
| 2011/0193739 A1 | 8/2011 | Strauch | |
| 2012/0076190 A1 | 3/2012 | Sturm | |
| 2012/0307928 A1* | 12/2012 | Jia | H04B 7/0667 375/267 |
| 2013/0343446 A1* | 12/2013 | Eliaz | H04L 27/230 375/230 |
| 2013/0343473 A1* | 12/2013 | Eliaz | H04L 1/0042 375/260 |
| 2013/0343480 A1* | 12/2013 | Eliaz | H04L 27/2628 375/295 |
| 2013/0343491 A1* | 12/2013 | Eliaz | H04L 27/2628 375/340 |
| 2014/0219240 A1* | 8/2014 | Ma | H04L 27/263 370/330 |
| 2014/0266857 A1 | 9/2014 | Mayer | |
| 2014/0321525 A1* | 10/2014 | Eliaz | H04L 27/2628 375/232 |
| 2015/0078491 A1* | 3/2015 | Eliaz | H04L 27/2628 375/341 |

* cited by examiner

DYNAMIC OFDM SYMBOL SHAPING FOR RADAR APPLICATIONS

PRIORITY CLAIM

This application claims priority to the following application(s), each of which is hereby incorporated herein by reference:

U.S. patent application Ser. No. 15/150,821 filed on May 10, 2016, which claims priority to U.S. provisional patent application 62/162,206 titled "Dynamic OFDM Symbol Shaping for Radar Applications" filed on May 15, 2015.

INCORPORATION BY REFERENCE

The entirety of each of the following applications is hereby incorporated herein by reference:

U.S. provisional patent application 62/155,728 titled "Multistatic Radar via an Array of Multifunctional Automotive Transceivers" filed on May 1, 2015;

U.S. patent application Ser. No. 15/142,926 titled "Multistatic Radar via an Array of Multifunctional Automotive Transceivers" filed on Apr. 29, 2016;

U.S. provisional patent application 62/160,015 titled "Calibration of a Multifunctional Automotive Radar System" filed on May 12, 2015;

U.S. provisional patent application 62/154,840 titled "Multifunctional Automotive Radar" filed on Apr. 30, 2015;

U.S. patent application Ser. No. 15/142,935 titled "Multifunctional Automotive Radar" filed on Apr. 29, 2016;

U.S. provisional patent application 62/160,316 titled "Scalable Architecture for an Automotive Radar System" filed on May 12, 2015; and U.S. provisional patent application 62/167,950 titled "Cooperative and Crowd-Sourced Multifunctional Automotive Radar" filed on May 29, 2015.

BACKGROUND

Limitations and disadvantages of conventional automotive radar systems and methods will become apparent to one of skill in the art, through comparison of such approaches with some aspects of the present method and system set forth in the remainder of this disclosure with reference to the drawings.

BRIEF SUMMARY

Methods and systems are provided for dynamic OFDM symbol shaping for radar applications, substantially as illustrated by and/or described in connection with at least one of the figures, as set forth more completely in the claims.

DETAILED DESCRIPTION

Figure 1:
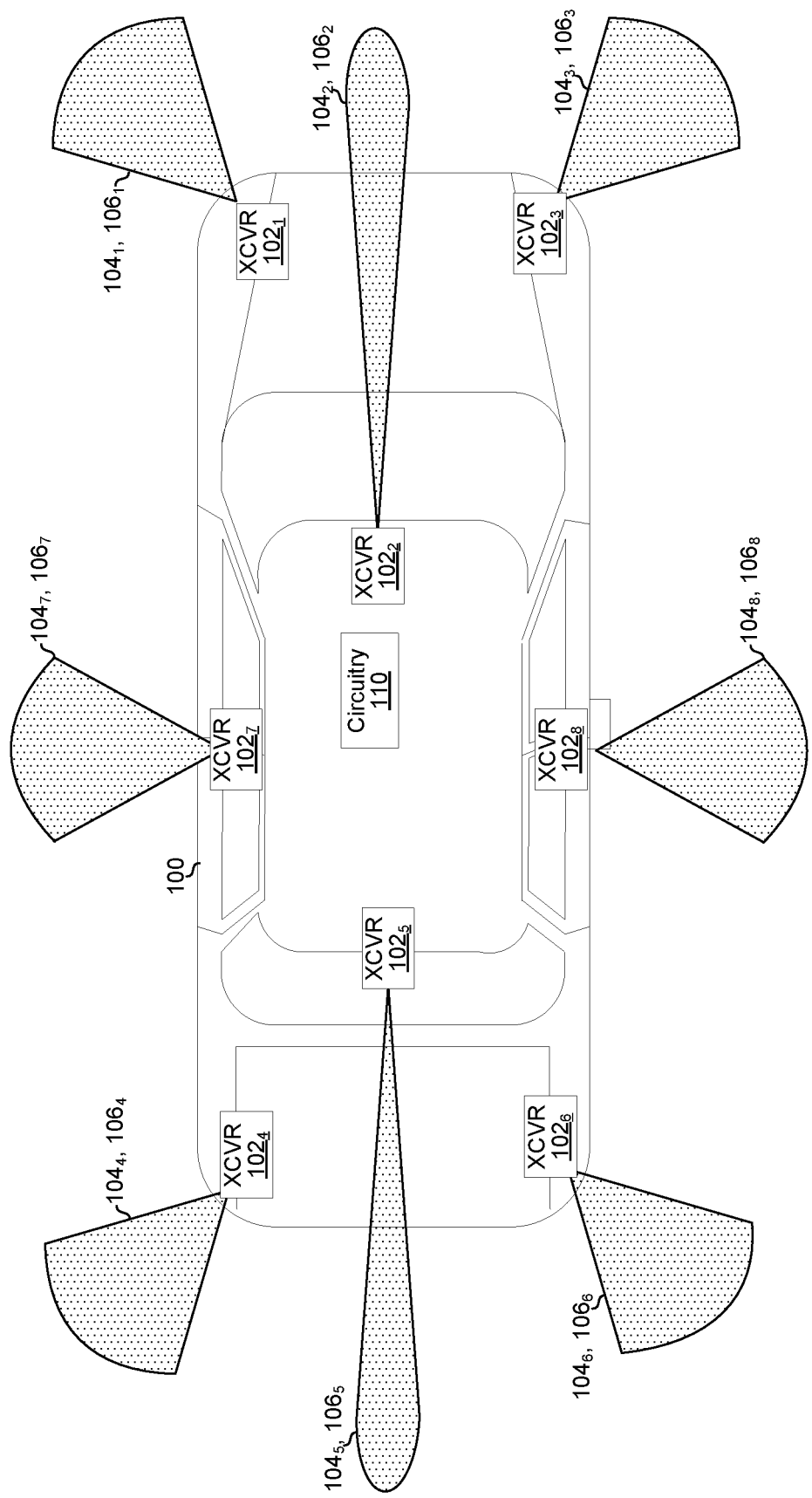
FIG. 1 shows an automobile comprising a plurality of multifunctional radar transceivers.

FIG. 1 shows an automobile comprising a plurality of multifunctional radar transceivers 102 (labeled with subscripts '1' through '8') of an automobile 100. Although the example automobile 100 comprises eight transceivers 102 for illustration, any number may be present. Each multifunctional radar transceiver 102 has a corresponding receive antenna pattern 104 and transmit antenna pattern 106 (for clarity of illustration, the transmit and receive patterns are shown as the same, but they need not be). As discussed in further detail in the remainder of this disclosure, the multifunctional radar transceivers 102 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 100 (the "scene").

The positioning function comprises use of the same millimeter wave signals used for the radar function to improve upon coarse position determined through other mechanisms such as GPS.

The communication function comprises communicating data among the multifunction radar transceivers 102 using of the same millimeter wave signals as are used for the radar function. Such data may include, for example, pixel or voxel data (and time and position metadata) generated using the radar and positioning functions.

Through a combination of the radar function, the positioning function, and the communication function, the multifunctional radar transceivers $102_1$-$102_8$ are operable to generate a scene representation (e.g., 2D pixel grid or 3D voxel grid) where the absolute time of capture of the scene representation and the absolute position of the pixels (2D) or voxels (3D) in the scene representation are known.

The circuitry 110 represents other circuitry of the automobile 100 such as one or more transceivers (e.g., cellular, Wi-Fi, BLUETOOTH®, GPS, etc.), instrumentation (e.g., entertainment system, driver indicators/gauges, driver controls), sensors for safety systems, etc. The circuitry 110 may be communicatively coupled to the transceivers 102 via a CANbus, for example. The circuitry 110 may be operable to process data from the transceivers and take action (e.g., trigger driver alerts, transmit messages via one or more of its transceivers, trigger braking or other safety systems, etc.) in response to such data. The circuitry 110 may also generate data which it may pass to the transceiver(s) 102 for communication to a remote transceiver 102 (e.g., that is mounted to another automobile and/or to infrastructure such the road, sign post, stop-light, etc.) In an example implementation, the circuitry 110 may comprise a cell phone that connects to an electronics system of the automobile 100 via USB, BLUETOOTH®, Wi-Fi, or any other suitable interface and then the electronics system 110 of the automobile 100 leverages the cellular transceiver of the circuitry 110 for connecting to a cellular network.

Figure 2A:
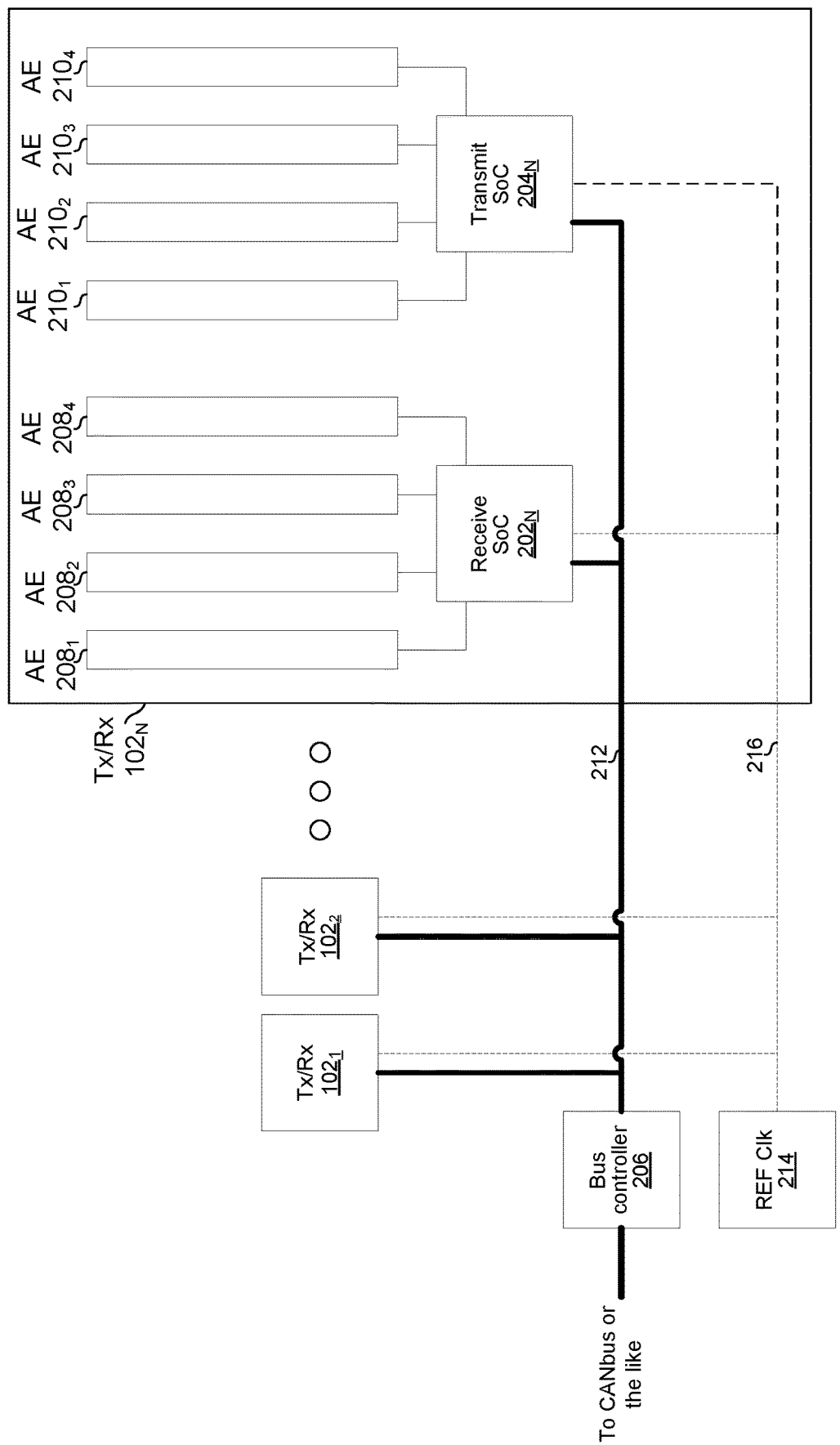
FIG. 2A shows an example architecture of a multifunctional radar system of an automobile.

FIG. 2A shows an example architecture of a multifunctional radar system of an automobile. The example multifunctional radar system 200 comprises N multifunction radar transceivers 102, a bus controller 206, a reference clock generator 214, data bus 212, and clock distribution bus 216. For clarity of illustration, example implementation details are shown for only the $N^{th}$ transceiver ($102_N$), but the other transceivers $102_1$-$102_{N-1}$ may be the same. Each multifunctional radar transceiver $102_n$ (the subscript 'n' used here to generically represent each of the transceivers $102_1$-$102_N$ individually) comprises a receive SoC $202_n$, a transmit SoC $204_n$, a plurality of receive antenna elements 208 (labeled with subscripts 1 through 4, where four was chosen arbitrarily for illustration but any number greater than one may be used), and a plurality of transmit antenna elements 210 (labeled with subscripts 1 through 4, where four was chosen arbitrarily for illustration but any number greater than one may be used, and the number of transmit antenna elements need not match the number of receive antenna elements). In an example implementation, each of the multifunctional radar transceivers 102 comprises one or more CMOS dies on a printed circuit board. In an example implementation, each of the receive SoCs $202_N$, the transmit SoC $204_N$, the bus controller 206, and the reference clock generator 214 is a separately packaged CMOS integrated circuit.

Each of the receive antenna elements $208_1$-$208_4$ comprises, for example, a copper microstrip patch antenna on a printed circuit board (e.g., FR4, DUROID®, or the like). Although four elements 208 are shown for illustration, any number may be used.

Each receive SoC $202_n$ is operable to receive millimeter wave signals (e.g., in the 76 to 81 GHz band) via the antenna elements $208_1$-$208_4$. The receive SoC $202_n$ is operable to process received millimeter wave signals for supporting the radar, positioning, and communication functions. The receive SoC $202_n$ is also operable to communicate over data bus 212 and to synchronize its timing to a signal output by reference clock 214 onto clock distribution bus 216. Additional details of an example receive SoC $202_n$ are described below with reference to FIG. 2B.

Each of the transmit antenna elements 210 comprises, for example, a copper microstrip patch antenna on a printed circuit board (e.g., FR4, DUROID®, or the like). Although four elements 210 are shown for illustration, any number may be used.

The transmit SoC $204_n$ is operable to transmit millimeter wave signals (e.g., in the 76 to 81 GHz band) via the antenna elements $210_1$-$210_4$. The transmit SoC $204_n$ is operable to generate the signals in such a manner as to support the radar, positioning, and communication functions. The transmit SoC $204_n$ is also operable to communicate over data bus 212 and to synchronize its timing to a signal output by reference clock 214 onto clock distribution bus 216. Additional details of an example transmit SoC $204_n$ are described below with reference to FIG. 2C.

The bus controller 206 is operable to relay data between the data bus 212 interconnecting the multifunction radar transceivers $102_1$-$102_N$ and a data bus of the automobile 100 (e.g., a CAN bus). The bus 212 may, for example, be a high speed serial bus and the bus controller 206, receive SoC $202_n$, and transmit SoC $204_n$ may each be operable to perform serialization and deserialization for communicating over the bus 212.

The reference clock generator 212 comprises a crystal oscillator, phase locked loop, and/or other circuitry for generating a signal to act as a phase reference for receive SoC $202_n$ and transmit SoC $204_n$. In an example implementation, the frequency of the reference signal may be relatively low compared to the millimeter wave frequencies (e.g., on the order of tens or hundreds of MHz), which may greatly relax the routing requirements for the bus 216 as compared to trying to distribute a reference signal in the 77 to 81 GHz range. In another example implementation, the frequency of the reference signal may be the same as the millimeter wave carrier frequency (e.g., in the range 77 to 81 GHz).

Figure 2B:
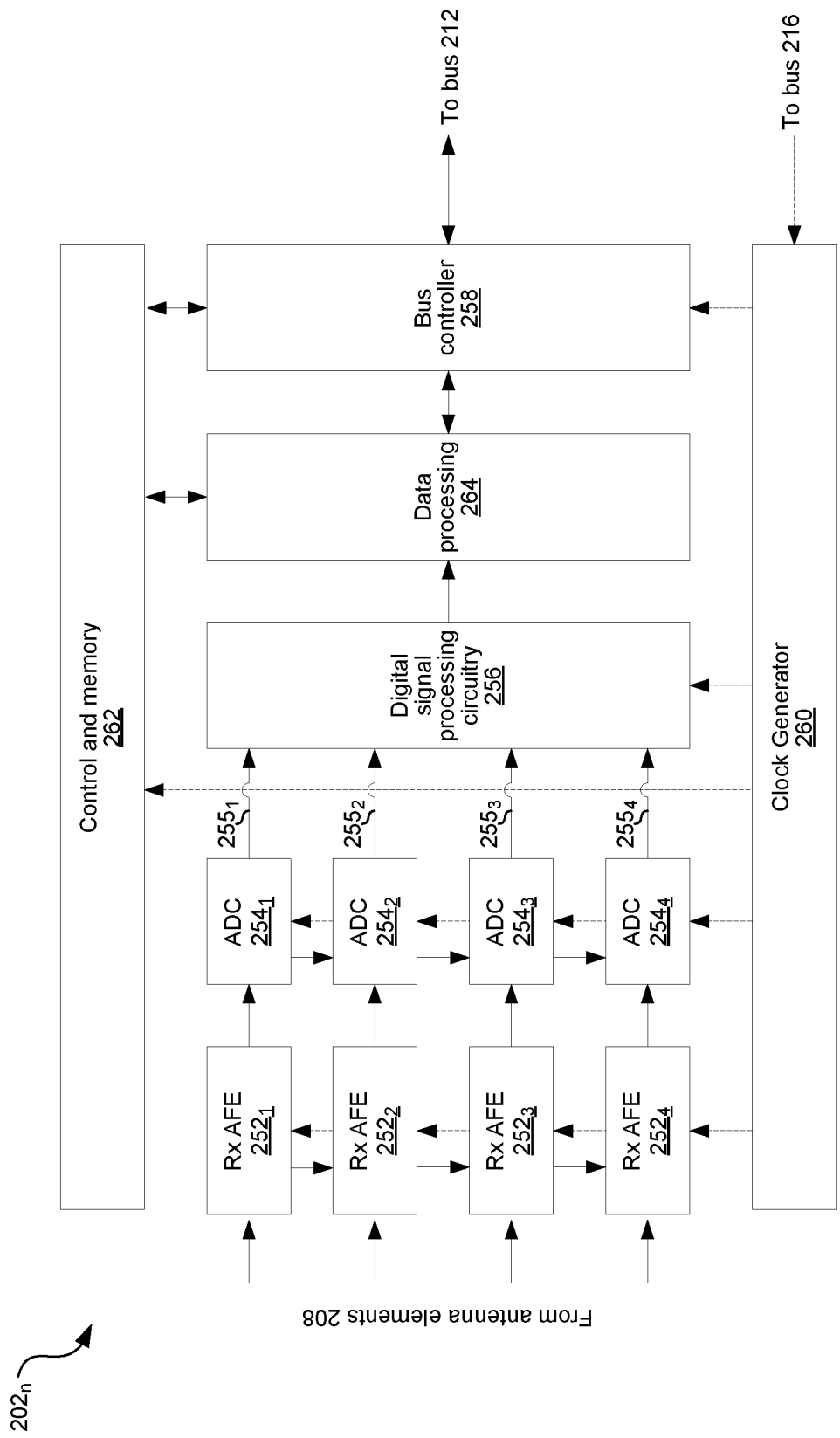
FIG. 2B shows an example implementation of a receiver system on chip (SoC) of a multifunctional radar transceiver of FIG. 2A.

FIG. 2B shows an example implementation of a receiver system on chip (SoC) of the multifunctional radar transceiver of FIG. 2A. The example receive SoC $202_n$ comprises a plurality (a number corresponding to the number of receive antenna elements 208) of receive analog front ends (Rx AFEs) 252, a plurality of analog-to-digital converters (ADCs) 254, digital signal processing circuitry 256, data processing circuitry 264, bus controller circuitry 258, clock generation circuit 260, and control and memory circuitry 262.

Each of the Rx AFEs 252 is operable to process a millimeter wave signal (e.g., in the band from 76 to 81 GHz) from a respective one of the plurality of antenna elements 208. The processing may comprise, for example, low noise amplification, filtering, and down-conversion so as to output a 1 to 5 GHz wide intermediate frequency or baseband signal.

Each of the ADCs 254 is operable to digitize the output of a corresponding one of the Rx AFEs 252. For example, each Rx AFE 252 may downconvert a received 76 to 77 GHz band to a 1 GHz wide baseband signal which the corresponding ADC 254 may then digitize to generate a 1 GHz wide digital signal. As another example, each Rx AFE 252 may downconvert a received 76 to 81 GHz band to a 5 GHz wide baseband signal which the corresponding ADC 254 may then digitize to generate a 5 GHz wide digital signal 255.

The digital signal processing circuitry 256 is operable to process the digitized signals from the plurality of ADCs 254 to recover information conveyed by the received signals. Such information may be conveyed by characteristics (e.g., latency, Doppler shift, signal strength, etc.) of the received signals, as is the case in a conventional radar system, and/or may be data that was modulated onto the received signals.

The processing performed by the digital signal processing circuit 256 may comprise, for example, channel estimation and equalization.

The processing performed by the digital signal processing circuit 256 may, where the millimeter wave signals are modulated by a data signal, comprise demodulation. For example, the millimeter wave signals transmitted by transceivers 102 may comprise bursts (or "chirps") whose amplitude is modulated relatively slowly as compared to the channel frequency (e.g., a few MHz as compared to a channel frequency of 76-81 GHz), and the digital signal processing circuitry 256 may be operable to track the signal envelope to recover the data signal. As another example, the millimeter wave signals transmitted by transceivers 102 may comprise OFDM symbols and the digital signal processing circuit 256 may be operable to demodulate the received signals using a discrete Fourier transform. The digital signal processing circuit 256 may then be operable to demap the modulated signal according to one or more symbol constellations, deinterleave the demapped bits, and decode the demapped bits. The recovered bits may then be provided to the control and memory subsystem 262 and/or output onto the bus 212.

The processing performed by the digital signal processing circuit 256 may comprise beamforming. The beamforming may comprise time-domain beamforming in which one or more sets of phase and amplitude coefficients is applied to each of the signals 255 in the time domain. Alternatively, or additionally, the beamforming may comprise frequency-domain beamforming in which the signals 255 are first transformed to the frequency domain (e.g., via a DFT) and then each subband (e.g., each OFDM bin or group of OFDM bins) is processed using a corresponding one or more beamforming matrices determined for that subband. In this manner, different subbands may be pointed in different directions.

The processing performed by the digital signal processing circuit 256 may comprise spectral analysis of the received signals. The spectral analysis may comprise, for example, mixing received signals with one or more reference signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected).

The processing performed by the digital signal processing circuit 256 may comprise separating different transmitted signals (e.g., originating from different ones of the transceivers $102_1$-$102_8$). The separating may comprise, for example, correlating the received signals with different orthogonal codes and/or pseudorandom sequences used by different ones of the transceivers $102_1$-$102_8$. Alternatively, or additionally, separating different transmitted signals (e.g., to determine which transceiver 102 sent which signal) may comprise directly recovering a respective identifier (e.g., a unique identifier such as a MAC address or similar) modulated onto each of the millimeter wave signals. The ability to distinguish which, if any, energy arrived from each of the transceivers $102_1$-$102_8$ may be useful for performing the radar function, the positioning function, and the communication function of the transceivers 102. For the radar and positioning functions, for example, the identification of which of transceivers $102_1$-$102_8$ sent any particular received signal may be used for determining the position and angle from which the signal was transmitted (since the different transceivers $102_1$-$102_8$ are at different positions on the automobile 100, which may be used for determining precise distance to, and location of, objects in the scene. For the communication function, for example, the identification of which of transceivers $102_1$-$102_8$ sent any particular received signal may be used in a manner similar to a "from" address in many networking protocols.

The data processing circuitry 264 is operable to process data output by the digital signal processing circuitry 256. Such processing may comprise, for example, implementing algorithms to generate a representation of the scene detected using the radar function. Based on the angle, strength, timing, spectral content, and/or other characteristics of the received signals, the data processing circuitry 264 may generate a 2D pixel grid or 3D voxel grid. In an example implementation, each pixel or voxel may indicate an absolute position to which it corresponds (determined via the positioning function of the multifunction radar system), the strength of returns, if any, received from that location (determined via the radar function of the multifunction radar system), spectral content of returns, if any, received from that location, and/or time(s) at which returns were received from that location and/or at which pixel or voxel data was updated.

The data processing circuitry 264 may also be operable to process data received from the data bus 212. For example, positioning information may be received via the bus 212 (e.g., GPS coordinates from a GPS receiver of the vehicle 100) and combined with data recovered from the digital processing circuitry 264 for performing the positioning function.

The processing performed by data processing circuitry 264 of data output by digital signal processing circuitry 256 may comprise, for example, preparing data for output onto the data bus 212. For example, a scene representation generated from the output of the digital signal processing circuitry 256 may be transmitted onto the data bus 212.

The bus controller circuitry 258 may be substantially similar to the bus controller 206 described above.

The clock generation circuitry 260 is operable to generate a plurality of timing signals that are synchronized to the timing signal received via bus 216. The timing signals may comprise, for example: a local oscillator signal for direct downconversion of received millimeter wave signals (e.g., in the 76 to 81 GHz range), a sampling clock for the ADCs 254 (e.g., between 2 and 20 GHz), and one or more clocks for clocking the digital processing circuitry 256, the bus controller 258, and the control and memory subsystem 262.

The control portion of subsystem 262 is operable to manage operations of the receiver SoC $202_n$ (e.g., implement a state machine and/or other control logic that controls the configuration of the other components of the receive SoC $202_n$). The control portion of subsystem 262 may, for example, configure beamforming matrices used by the digital signal processing circuitry 256. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications from other transceivers 102 that are likely to come from that direction. Directions of interest may be determined based on, for example, data received via the data bus, data carried in previously received millimeter wave signals, and/or previously generated scene representations.

The memory portion of subsystem 262 is operable to store relatively large amounts (e.g., hundreds of megabits) of information of a variety of forms. For example, beamforming matrices, an identifier of the transceiver 102, scrambling codes, and messages received from (via data bus 212) and/or to be communicated to (via data bus 212 and/or via millimeter wave signals) other transceivers are just some examples of the information which may be stored in the memory and readily accessible to the SOC $202_n$.

Figure 2C:
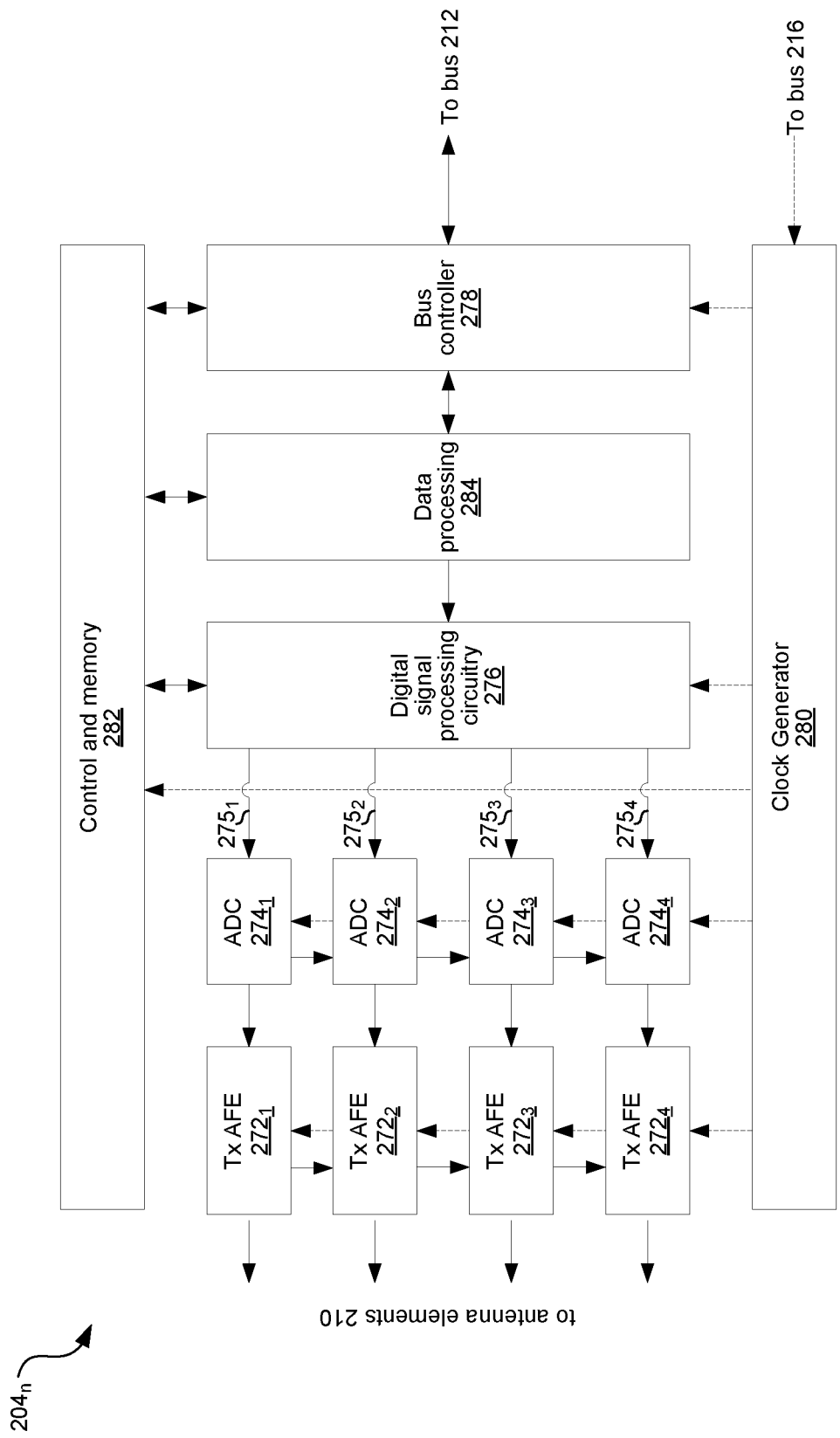
FIG. 2C shows an example implementation of a transmitter system on chip (SoC) of a multifunctional radar transceiver of FIG. 2A.

FIG. 2C shows an example implementation of a transmitter system on chip (SoC) of the multifunctional radar transceiver of FIG. 2A. The example transmit SoC $204_n$ comprises a plurality of transmit analog front ends (Tx AFEs) 272, a plurality of analog-to-digital converters (ADCs) 274, digital signal processing circuitry 276, data processing circuitry 284, bus controller circuitry 278, clock generation circuit 280, and control and memory subsystem 282.

Each of the Tx AFEs 272 is operable to receive an analog baseband signal from a respective one of ADCs 274, upconvert the signal to a millimeter wave (e.g., a 1 GHz to 5 GHz wide signal in the band from 76 to 81 GHz), and amplify the millimeter wave signal for output to a respective one of antenna elements $210_1$-$210_4$.

Each of the ADCs 274 is operable to convert a digital signal 275 from the digital signal processing circuitry 276 to an analog representation. For example, each signal 275 may be a 1 GHz to 5 GHz wide baseband signal.

The digital signal processing circuitry 276 is operable to process one or more data streams from data processing circuitry 284 to generate a plurality (four in the example shown) of digital baseband signals 275. Processing performed by digital signal processing circuitry 276 may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The processing performed by the digital signal processing circuit 276 may comprise generating modulated signals $275_1$-$275_4$ and/or generating a data signal to be modulated onto a carrier. As an example of the former case, the digital signal processing circuit 276 may output a continuous wave signal, or a chirp whose amplitude is modulated by a data signal whose frequency is relatively low (e.g., a few MHz) as compared to the channel frequency (e.g., between 76 GHz and 81 GHz). As another example of the former case, the digital signal processing circuit 276 may output an OFDM signal. As an example of the latter case, the digital signal processing circuit 276 may output a relatively low bandwidth data signal (e.g., a few MHz) which may modulate a millimeter wave chirp generated by the clock generator 280.

The processing performed by the digital signal processing circuit 276 may comprise beamforming. The beamforming may comprise time-domain beamforming and/or frequency-domain beamforming.

Data processing circuit 284 is operable to generate one or more data signals for modulation onto the millimeter wave signals transmitted by the SoC $204_n$. The datastreams may, for example, be read from memory of the SoC $202_n$ (e.g., an identifier of the module $102n$) and/or generated algorithmically (e.g., timestamps generated based on a clock of the control portion of subsystem 282). Additionally, or alternatively, the data may be received from bus 212 via bus controller 278. The data processing circuit 284 may packetize and/or otherwise format the data.

Bus controller 278 may be substantially similar to the bus controller 206 described above.

Clock generation circuit 280 is operable to generate a plurality of timing signals that are synchronized to the timing signal received via bus 216. The timing signals may comprise, for example: a local oscillator signal for upconversion of baseband signals to millimeter wave signals (e.g., in the 76 to 81 GHz range), a sampling clock for the DACs 274 (e.g., between 2 and 20 GHz), and one or more clocks for clocking the digital processing circuitry 276, the bus controller 278, and the control and memory subsystem 282.

The control portion of subsystem 282 is operable to manage operations of the receiver SoC $204_n$ (e.g., implement a state machine and/or other control logic that controls the configuration of the other components of the receive SoC $204_n$). The control portion of subsystem 282 may, for example, configure beamforming matrices used by the digital signal processing circuitry 276. For example, the control portion of subsystem 282 may determine that particular directions are of interest at a given time and may configure the beamforming to point beams in those particular directions. Particular directions may be of interest because, for example, it may be desirable to determine more information about objects located in that direction and/or to listen for communications from other transceivers 102 that are likely to come from that direction. Directions of interest may be determined based on, for example, data received via the data bus 212, scene scanning algorithms, and/or the like.

The memory portion of subsystem 282 is operable to store relatively large amounts (e.g., hundreds of megabits) of information of a variety of forms. For example, beamforming matrices, and messages received from (via data bus 212 and/or millimeter wave signals) and/or to be communicated to (via data bus 212 and/or modulated onto millimeter wave radar signals) other transceivers are just some examples of the information which may be stored in the memory and readily-accessible to the SoC $204n$.

Figure 3A:
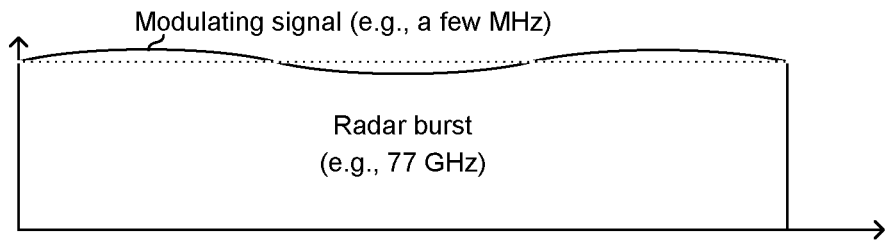
FIGS. 3A and 3B show two example signal formats used by a multifunctional radar transceiver.
Figure 3B:
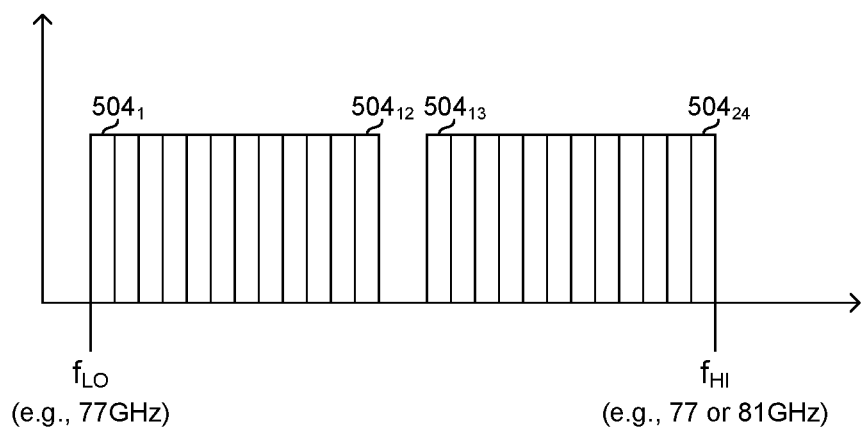

FIGS. 3A and 3B show two example signal formats used by a multifunctional radar transceiver. In FIG. 3A, the millimeter wave signal (e.g., a continuous wave signal or series of frequency ramped "chirps") is amplitude modulated by a relatively slowly varying data signal. In FIG. 3B the millimeter wave signal is an OFDM signal which, for any given burst (frame) may transmit one or more of a plurality of subbands 504 (twenty-four subbands were chosen arbitrarily for illustration, any number may be used). Each of the subbands $504_1$-$504_{24}$ may be a continuous wave or may be modulated by a data signal (e.g., a N-QAM symbol corresponding to $\log_2(N)$ bits of the data signal). Different subbands and/or groups of subbands may be allocated for different purposes (e.g., some for radar, some for positioning, and some for communication). Similarly, using frequency-domain beamforming, different subbands and/or groups of subbands may be pointed in different directions for detecting objects at different locations in the scene and/or for transmitting the data signal in directions (e.g., pointed at different reflection paths leading to different ones of the transceivers $102_1$-$102_8$).

Data modulated onto the millimeter wave signal may be forward error correction encoded for robustness. Data modulated onto the millimeter wave signal may be scrambled or encrypted for security (e.g., to prevent spoofing, sniffing of communications, etc.).

Figure 4:
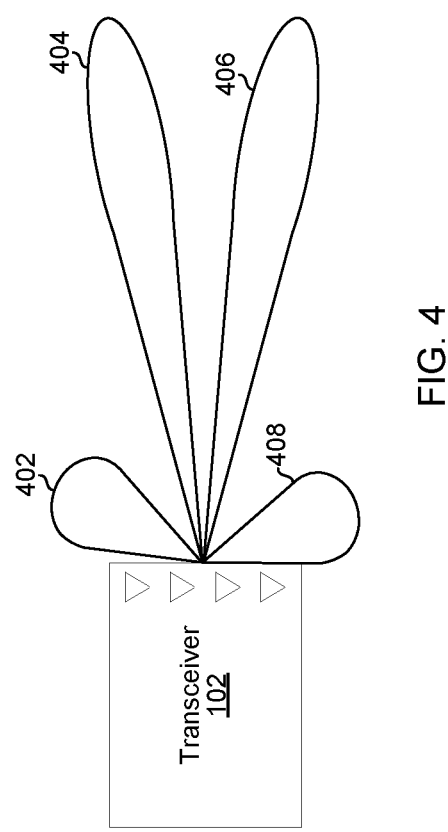
FIG. 4 shows an example antenna pattern of the multifunctional radar transceiver of FIG. 2.

FIG. 4 shows an example antenna pattern of the multifunctional radar transceiver of FIG. 2. For example, for the radar function, lobes 402 and 408 may be used for identifying objects that are relatively close and off to the side of the transceiver $102_n$, and the lobes 404 and 406 may be used for looking further in the distance (e.g., in the direction of travel of the automobile 100 or looking behind the automobile 100). As another example, for the radar function, the lobes 402 and 408 may receive returns from the nearby road surface and the Doppler of such returns may be used for calculating the speed of the automobile 100. As another example, for the communication function, lobes 402 and 408 may be used for directly communicating with another transceiver 102 off to the side of the depicted transceiver $102_n$ and lobes 404 and 406 may be used for communicating with other transceivers by bouncing the signals off of objects in the scene.

Although four beams/lobes are shown for illustration, the multifunctional radar transceivers are not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers with which it is necessary or desirable to communicate at any given time. Similarly, the directions of the beams may vary over time. For example, the directionality of any one or more of the beams 402, 404, 406, and 408 may change periodically, based on what is detected in the scene, based on desired communication to be sent or received, and/or the like.

Figure 5:
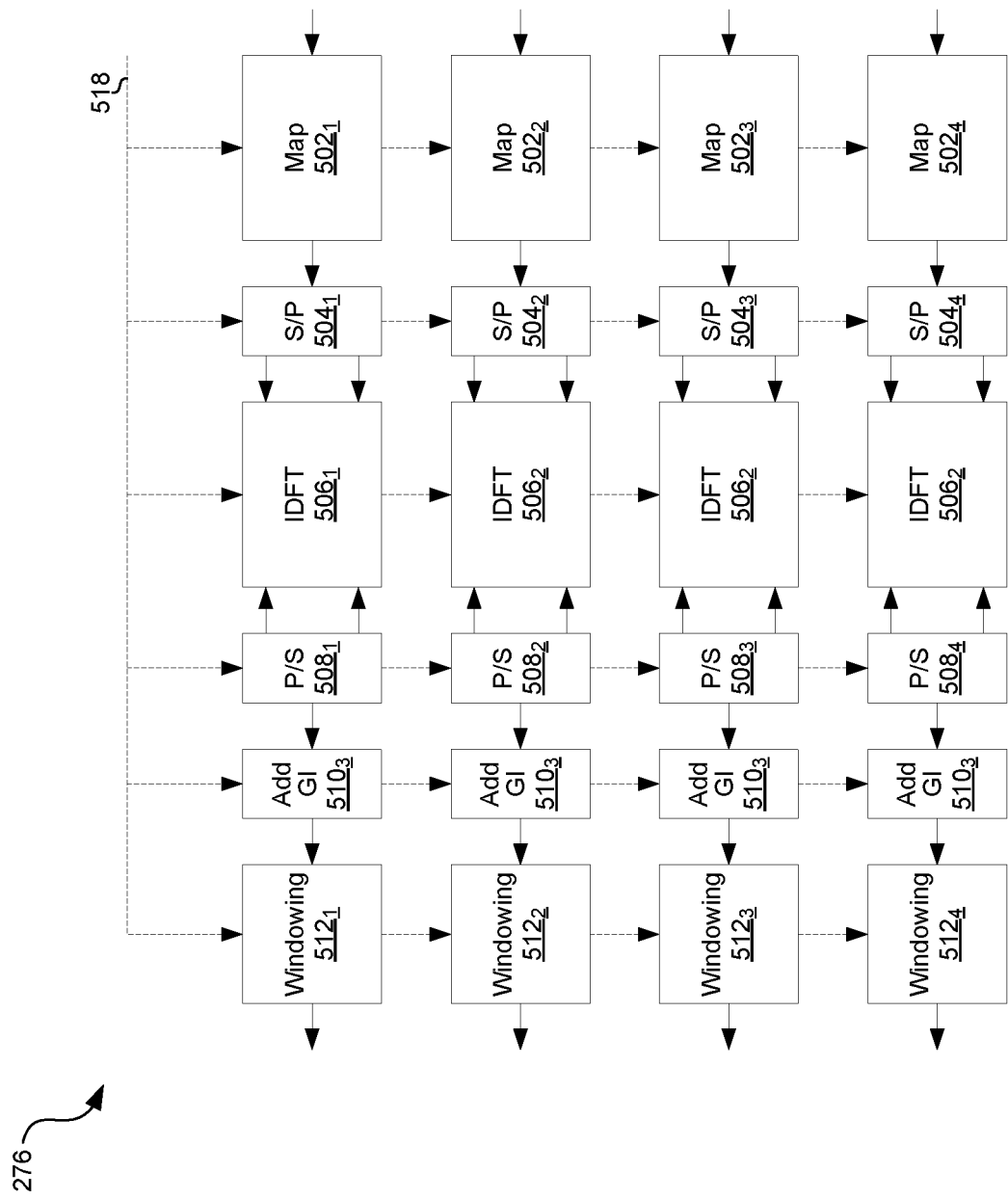
FIG. 5 illustrates example digital signal processing circuitry of the transmitter of FIG. 2C.

FIG. 5 illustrates example digital signal processing circuitry of the transmitter of FIG. 2C. The example implementation of the digital signal processing circuitry 276 shown in FIG. 5 comprises a plurality of transmit signal paths corresponding to the plurality of antennas. While four antennas are shown in the example, any other number may be used and fall within the scope of the disclosure. Each signal path comprises a mapper 502$_X$ (X between 1 and 4 in the example shown), a serial-to-parallel (S/P) conversion circuit 504$_X$, an inverse discrete Fourier transform (IDFT) circuit 506$_X$, a parallel-to-serial conversion circuit 508$_X$, a guard interval insertion circuit 510$_X$, and a windowing circuit 512$_X$.

Each mapper 502$_X$ maps its input bit stream to symbols according to a determined constellation (e.g., PAM, QPSK, N-QAM, or the like). The S/P circuit 504$_X$ then parallelizes the symbols/maps symbols to subcarriers. The IDFT circuit 506$_X$ converts the parallel symbols to time-domain samples. The P/S circuit 508$_X$ serializes the time-domain samples. The guard interval insertion circuit 510$_X$ inserts a guard interval (e.g., including a cyclic prefix). The windowing circuit 512$_X$ filters the signal according to a selected windowing function.

Control signal 518 from the control and memory subsystem 282 configures the various circuits of each path and may do so dynamically (e.g., in response to instructions via data bus 212 which may, in turn, be in response to analysis of scene representations generated by receiver 202$_N$ and/or retrieved from a networked database) and/or deterministically (e.g., alter configurations at predefined times, with predefined periodicity and/or with predefined duty cycle).

Figure 6B:
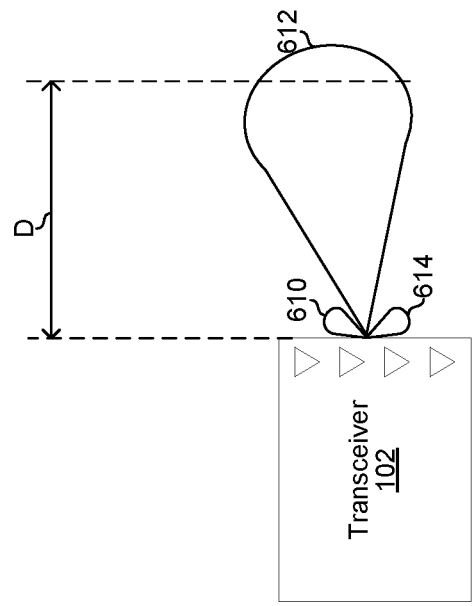
FIGS. 6A and 6B illustrate different radiation patterns corresponding to different windowing functions.
Figure 6A:
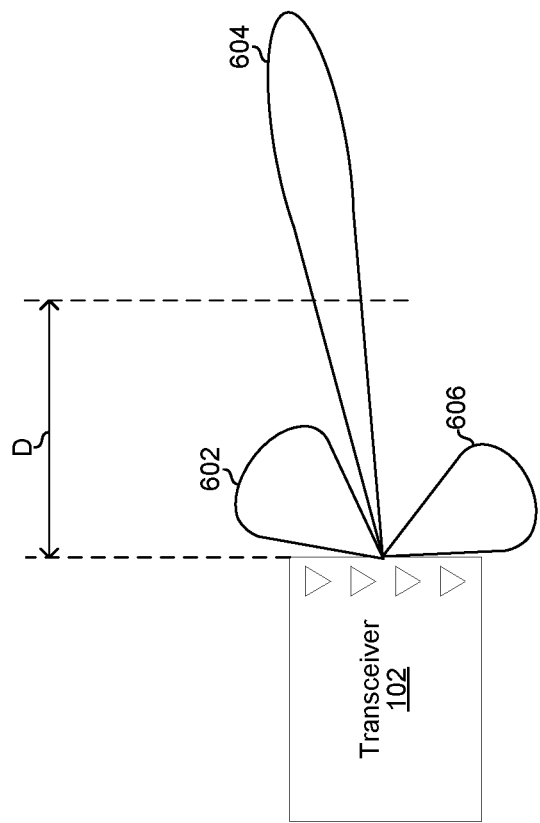

In an example implementation, a windowing function applied by each of circuits 512$_1$-512$_4$ may be reconfigured dynamically. For example, a first windowing function may be used when a large maximum unambiguous range is desired and a second function may be used when it is desired to scan objects that are close to the transceiver 102$_N$. Referring to the time domain response, the first windowing function may result in a strong, narrow main lobe, but at the expense of relatively high sidelobes (i.e., strong ringing) which obscure returns from nearby objects (e.g., the pattern shown in FIG. 6A with strong narrow main lobe 604 and relatively large side lobes 602 and 606). Conversely the second windowing function may achieve relatively low side lobes (i.e., less ringing), but at the expense of a weaker, fatter main lobe that cannot "see" relatively-distant objects (e.g., the pattern shown in FIG. 6B with wider main lobe 612 and relatively small side lobes 610 and 614). The transceiver 102$_N$ may switch between these two windowing functions periodically. The transceiver 102$_N$ system may switch between the two functions based on analysis of a recently generated scene representation (e.g., the previous scene representation generated using the first windowing function revealed one or more nearby objects and now it is desired to use the second windowing function to get more informative returns for those objects). The transceiver 102$_N$ may switch between the two windowing functions based on analysis of a historical scene representations for the current location of the automobile 100 (e.g., upon arriving at a particular location the automobile downloads a representation of the "normal" or expected scene at the location which shows that there was a large nearby object when the representation was generated, the transceiver 102$_N$ selects the second windowing function to investigate if the object is still there and perhaps obtain better information about it). In an example implementation, the window function to be used may be selected independently for each antenna lobe (i.e., each direction that the transceiver 102$_N$ wants to scan). In an example implementation, two OFDM symbols may be orthogonally coded such that they can be transmitted simultaneously by the same transceiver 102$_N$ and one may use the first widowing function and the second may use the second windowing function.

In an example implementation, subcarrier spacing and/or a number of subcarriers used by each of circuits 512$_1$-512$_4$ may be reconfigured dynamically. The transceiver 102$_N$ may switch between different numbers of subcarriers and/or different subcarrier spacings periodically. The transceiver 102$_N$ may switch between different numbers of subcarriers and/or different subcarrier spacings based on a desired unambiguous range, a desired unambiguous velocity, and/or a desired range resolution. The transceiver 102$_N$ may switch between different numbers of subcarriers and/or different subcarrier spacings based on analysis of a recently generated scene representation. The transceiver 102$_N$ may switch between the different numbers of subcarriers and/or subcarrier spacings based on analysis of a historical scene representation for the current location of the automobile 100. The number of subcarriers and/or subcarrier spacing to be used may be selected independently for each antenna lobe (i.e., each direction that the transceiver 102$_N$ wants to scan). In an example implementation, two OFDM symbols may be orthogonally coded such that they can be transmitted simultaneously by the same transceiver 102$_N$ and one may use a first number of subcarriers and/or subcarrier spacing and the second may use a second number of subcarriers and/or subcarrier spacing.

In accordance with an example implementation of this disclosure, a radar transmitter (e.g., 204$_n$) comprises orthogonal frequency division multiplexing (OFDM) symbol generation circuitry (e.g., 502, 504, 506, 508, 510) windowing circuitry (e.g., 512), and control circuitry (e.g., 282 and 284). The OFDM symbol generation circuitry is operable to modulate data onto a plurality of subcarriers to generate a plurality of OFDM symbols. The windowing circuitry is configurable to support a plurality of windowing functions. The control circuitry is operable to analyze returns from a previous transmission of the radar transmitter to determine characteristics of the environment into which the previous transmission was transmitted. The control circuitry is operable to select which one of the plurality of windowing functions the windowing circuitry is to apply to each of the plurality of OFDM symbols based on the characteristics of the environment. A first one of the windowing functions may correspond to a first radiation pattern and the second one of the windowing functions may correspond to a second radiation pattern. A main lobe (e.g., 604) of the first radiation pattern may be relatively wide compared to a main lobe (e.g., 612) of the second radiation pattern. The characteristics of the environment may comprise distance to an object determined, at least in part, based on a time of flight of the returns. The control circuitry may be operable to select the first one of the windowing functions when the distance is less than a threshold (e.g., distance 'D' in FIGS. 6A and 6B), and select the second one of the windowing functions when the distance is greater than the threshold. The control circuitry may be operable to periodically switch between the first one of the windowing functions and the second one of the windowing functions. The characteristics of the environment may include detection of the presence of an object that is not present in in previously-analyzed returns for the same location. The OFDM symbol generation circuitry is configurable to support a variable number and/or spacing of subcarriers per OFDM symbol such that different ones of the plurality of OFDM symbols have different numbers of subcarriers and/or different spacing of subcarriers. The characteristics of the environment may comprise speed of an object as determined based, at least in part, on a Doppler shift of the returns. The control circuitry may be operable to select a first number of subcarriers (e.g., 'N' (an integer) subcarriers) and/or spacing of subcarriers (e.g., 'A' (an integer) Hertz) when the speed is less than a threshold, and select a second number of subcarriers (e.g., 'M' (an integer not equal to 'N') subcarriers) and/or spacing of subcarriers (e.g., 'B' (an integer not equal to 'A') Hertz) when the speed is greater than the threshold.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A system comprising:
a radar transmitter comprising orthogonal frequency division multiplexing (OFDM) symbol generation circuitry, windowing circuitry, and control circuitry, wherein:
the OFDM symbol generation circuitry is operable to generate a plurality of OFDM symbols;
the windowing circuitry is configurable to support a plurality of windowing functions; and
the control circuitry is operable to:
analyze returns from a previous transmission of the radar transmitter to determine characteristics of an environment into which the previous transmission was transmitted; and
select which one of the plurality of windowing functions the windowing circuitry is to apply to each of the plurality of OFDM symbols based on the returns.

2. The system of claim 1, wherein a first one of the windowing functions corresponds to a first radiation pattern and the second one of the windowing functions corresponds to a second radiation pattern.

3. The system of claim 2, wherein a main lobe of the first radiation pattern is relatively wide compared to a main lobe of the second radiation pattern.

4. The system of claim 2, wherein the characteristics of the environment comprise distance to an object determined, at least in part, based on a time of flight of the returns.

5. The system of claim 4, wherein the control circuitry is operable to select the first one of the windowing functions when the distance is less than a threshold, and select the second one of the windowing functions when the distance is greater than the threshold.

6. The system of claim 2, wherein the control circuitry is operable to periodically switch between the first one of the windowing functions and the second one of the windowing functions.

7. The system of claim 1, wherein the characteristics of the environment include an indication of presence of an object that is not present in previously-analyzed returns for a same location.

8. The system of claim 1, wherein the OFDM symbol generation circuitry is configurable to support a variable number and/or spacing of subcarriers in generating each OFDM symbol such that different ones of the plurality of OFDM symbols have different numbers of subcarriers and/or different spacing of subcarriers.

9. The system of claim 7, wherein the characteristics of the environment comprise speed of an object as determined based, at least in part, on a Doppler shift of the returns.

10. The system of claim 9, wherein the control circuitry is operable to select a first number and/or spacing of subcarriers in generating the plurality of OFDM symbols when the speed is less than a threshold, and select a second number and/or spacing of subcarriers when the speed is greater than the threshold.

11. A method comprising:
generating, by OFDM symbol generation circuitry of a radar transmitter, a plurality of OFDM symbols;
analyzing, by control circuitry of the radar transmitter, returns from a previous transmission of the radar transmitter to determine characteristics of an environment into which the previous transmission was transmitted; and
selecting, by the control circuitry based on the returns, which one of a plurality of windowing functions windowing circuitry of the radar transmitter is to apply to each of the plurality of OFDM symbols.

12. The method of claim 11, wherein a first one of the windowing functions corresponds to a first radiation pattern and the second one of the windowing functions corresponds to a second radiation pattern.

13. The method of claim 12, wherein a main lobe of the first radiation pattern is relatively wide compared to a main lobe of the second radiation pattern.

14. The method of claim 12, wherein the characteristics of the environment comprise distance to an object determined, at least in part, based on a time of flight of the returns.

15. The method of claim 14, comprising selecting, by the control circuitry, the first one of the windowing functions when the distance is less than a threshold, and the second one of the windowing functions when the distance is greater than the threshold.

16. The method of claim 11, comprising periodically switching, by the control circuitry, between the first one of the windowing functions and the second one of the windowing functions.

17. The method of claim 12, wherein the characteristics of the environment include an indication of presence of an object that is not present in previously-analyzed returns for a same location.

18. The method of claim 11, comprising configuring, by the control circuitry, OFDM symbol generation circuitry such that different ones of the plurality of OFDM symbols have different numbers of subcarriers and/or different spacing of subcarriers.

19. The method of claim 17, wherein the characteristics of the environment comprise speed of an object determined, at least in part, based on a Doppler shift of the returns.

20. The method of claim 19, comprising selecting, by the control circuitry, a first number and/or spacing of subcarriers in generating the plurality of OFDM symbols when the speed is less than a threshold, and a second number and/or spacing of subcarriers when the speed is greater than the threshold.

* * * * *